March 12, 1946.  J. R. JIMENEZ  2,396,325
WHEELED CARRIER FOR MILK CANS AND THE LIKE
Filed Dec. 19, 1944
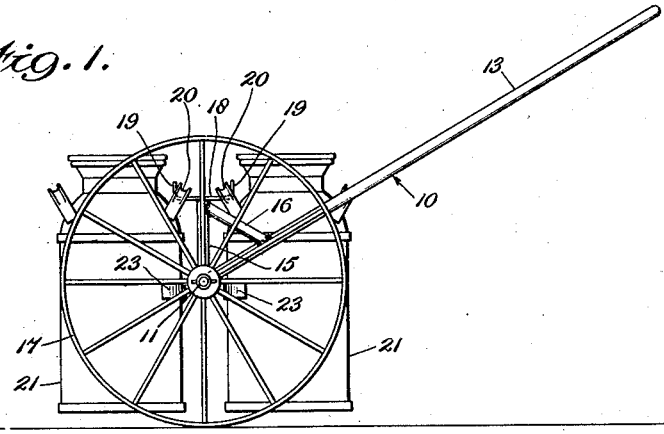
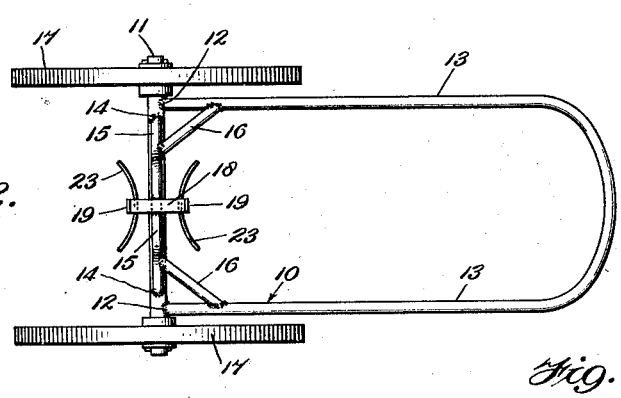
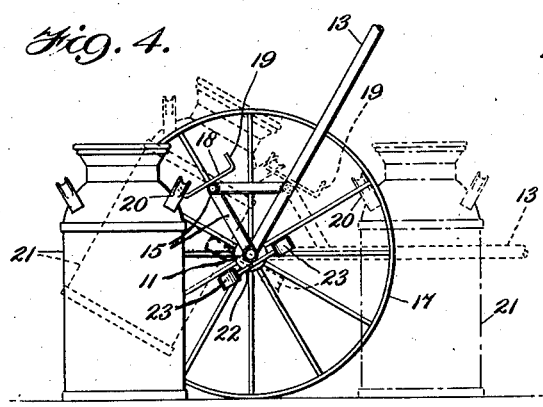
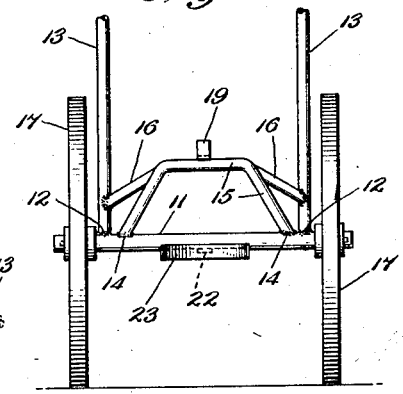
Inventor
J. R. Jimenez,
By
Attorney Patented Mar. 12, 1946

2,396,325

UNITED STATES PATENT OFFICE 2,396,325

WHEELED CARRIER FOR MILK CANS AND THE LIKE

Jim R. Jimenez, Blackfoot, Idaho

Application December 19, 1944, Serial No. 568,836

1 Claim. (Cl. 214—65.4)

The invention relates to wheeled carriers and has for its principal object the provision of an improved apparatus of this character which is primarily intended for use in handling milk cans and the like.

A further object of the invention is to provide a hand cart or carrier for milk cans or similar containers, which is of relatively simple and inexpensive construction and which is constructed to provide for the transport of a plurality of such cans in a substantially balanced arrangement, whereby manipulation of the cart will be less tiring upon the operator.

With the above and other objects in view which will appear as the description proceeds, the invention resides in the novel details of construction and combinations of parts more fully hereinafter disclosed and particularly pointed out in the appended claim.

For purposes of disclosure one form of the invention has been illustrated in the accompanying drawing forming a part of this specification, in which like reference characters designate like parts in all the views, and in which:

Figure 1 is a side elevational view of a carrier constructed and arranged in accordance with the invention, the parts being shown in the normal operating positions occupied when the device is being employed in the transport of conventional milk cans;

Fig. 2 is a top plan view of the carrier shown in Fig. 1;

Fig. 3 is an end elevational view of the carrier, as seen from the left of Fig. 1; and Fig. 4 is a longitudinal sectional-elevational view, showing in full and dotted lines the positions assumed by the carrier for the purpose of picking up and discharging the cans.

As will be clear from the said drawing, the carrier comprises a frame 10, which as here shown may be conveniently formed of tubular metallic elements welded together, and which comprises a horizontal axle member 11 to which is welded, as at 12, the ends of a U-shaped element 13 which serves as a handle or means by which the apparatus may be manipulated by the operator, both for pick-up and discharge of the cans and for traverse of the carrier over the ground. The axle 11 also has welded to it, as at 14, the ends of a normally upright bridge member 15, from which diagonal brace members 16 may extend to the respective legs of the member 13. The end portions of the axle 11, beyond the junctures of the legs of the member 13, provide journals for a pair of wheels 17 which support the frame 10 for traverse over the ground, as will be readily understood.

To the central portion of the bridge member 15 is welded a longitudinally extending strap 18 which projects equidistantly to each side of the bridge member, and the end portions 19 of which are turned upwardly to provide hooks for engagement with the handles 20 of the cans 21. To the central portion of the axle 11 is welded a longitudinally extending bar 22, projecting equidistantly to each side of the said axle and carrying at each end a curved cradle member 23. The parts are so constructed and arranged that when the carrier is in the normal operating position shown in Fig. 1 the hooks 19 are at a sufficient height above the ground that with such hooks engaged in the can handles 20, both cans will be supported with their bottoms at least two or three inches above the ground, and with their bodies engaged and partially encircled by the cradle members 23.

The mode of loading the carrier will be clear from Fig. 4. Considering the end of the carrier from which the handle member 13 extends as the rearward end, the carrier may be advanced to a position adjacent a can 21 such as is shown in full lines in said figure, the handle 13 elevated to approximately the angle shown, thereby depressing the forward hook 19 sufficiently to enable it to be entered into the aperture of the can handle 20, after which, upon restoration of the carrier parts to substantially the positions of Fig. 1, the forward cradle member 23 will be brought into engagement with the can body and the can will be elevated by the hook and supported in a substantially vertical position with its bottom clear of the ground. The carrier is then moved rearwardly to a position adjacent a second can, such as is shown in broken lines in Fig. 4, and upon depressing the handle 13 to move the parts to approximately the dotted line positions shown in said figure, the rearward hook 19 may be engaged in a handle 20 of such can. Then upon returning the handle 13 to the Fig. 1 position, the two cans will be ready for transport. Obviously, the cans may be removed from the carrier by a reversal of the procedure just outlined.

It will be noted that the cans are carried in tandem, with one disposed to either side of the vertical plane of the axis of the axle member 11, so that, assuming they are both empty or are substantially equally filled, the weight of the one will counterbalance that of the other. Thus, apart from the relatively small force necessary to overcome the effect of gravity on the handle member 13, the operator is called upon to exert no effort in keeping the cans clear of the ground but may concentrate upon movement of the carrier and its load from place to place. Operation of the carrier therefore is less fatiguing than has been the case with prior devices of a similar character, and in fact the present carriers, even when handling cans containing several hundred pounds of milk, have been readily operated by children.

Of course, the present carriers may be employed for the transport of a single can if desired, but obviously under such circumstances the advantages of the counterbalancing effect of the two cans carried in tandem, one on each side of the plane of the axle axis, will be lost.

While one form of the invention has been illustrated and described, it will be readily understood that those skilled in the art may vary the details of construction as well as the precise arrangement of the parts without departing from the spirit of the invention, and therefore it is not wished to be limited to the above disclosure except as may be required by the claim.

What is claimed is:

In a carrier for a plurality of milk cans and the like, a frame including an axle and a member disposed above said axle; wheels mounted on the axle for supporting the frame for traverse over the ground and for tilting movements about the axis of the axle; and means for supporting the cans clear of the ground and in tandem counterbalanced relationship with respect to the vertical plane of said axle axis, comprising a pair of hooks carried by said frame member, one to either side of said vertical plane, for ready engagement with and disengagement from the handles of the cans through said tilting movements of the frame in opposite directions about said axis, and a pair of cradle members carried by said axle, one to either side of said vertical plane, for engagement with the bodies of the respective cans.

JIM R. JIMENEZ.